(12) United States Patent
Ingino

(10) Patent No.: US 9,198,016 B2
(45) Date of Patent: Nov. 24, 2015

(54) ENTERPRISE WIRELESS DEVICE USAGE REPORTING

(71) Applicant: The Active Network, LLC, San Diego, CA (US)

(72) Inventor: Greg Ingino, San Diego, CA (US)

(73) Assignee: ACTIVE NETWORK, LLC, Dallas, TX (US)

(*) Notice: Subject to any disclaimer, the term of this patent is extended or adjusted under 35 U.S.C. 154(b) by 239 days.

(21) Appl. No.: 13/790,145

(22) Filed: Mar. 8, 2013

(65) Prior Publication Data

US 2014/0066008 A1    Mar. 6, 2014

Related U.S. Application Data

(60) Provisional application No. 61/696,637, filed on Sep. 4, 2012.

(51) Int. Cl.
| | |
|---|---|
| *H04M 11/00* | (2006.01) |
| *G07B 17/00* | (2006.01) |
| *H04W 4/24* | (2009.01) |
| *H04W 48/18* | (2009.01) |
| *H04M 15/00* | (2006.01) |

(52) U.S. Cl.
CPC ............. *H04W 4/24* (2013.01); *H04M 15/43* (2013.01); *H04M 15/44* (2013.01); *H04M 15/51* (2013.01); *H04M 15/52* (2013.01); *H04W 48/18* (2013.01)

(58) Field of Classification Search
CPC ...................................................... H04W 4/24
USPC ............... 455/405, 406, 408; 705/30, 34, 73; 379/114.22
See application file for complete search history.

(56) References Cited

U.S. PATENT DOCUMENTS

| | | | |
|---|---|---|---|
| 5,291,543 A | 3/1994 | Freese et al. | |
| 5,684,861 A | 11/1997 | Lewis et al. | |
| 5,771,282 A * | 6/1998 | Friedes | ..................... 379/121.03 |
| 5,987,107 A | 11/1999 | Brown | |
| 6,198,915 B1 | 3/2001 | McGregor et al. | |
| 6,442,406 B1 | 8/2002 | Harris et al. | |
| 6,615,034 B1 * | 9/2003 | Alloune et al. | ............... 455/406 |
| 7,711,350 B2 | 5/2010 | Bhogal et al. | |
| 7,797,206 B1 * | 9/2010 | Marchbanks et al. | .......... 705/34 |
| 7,817,983 B2 | 10/2010 | Cassett et al. | |
| 8,140,361 B2 | 3/2012 | Fredericks et al. | |
| 8,219,062 B2 | 7/2012 | Bandera et al. | |
| 8,260,252 B2 | 9/2012 | Agarwal | |
| 8,265,590 B2 | 9/2012 | Sennett et al. | |

(Continued)

*Primary Examiner* — William Nealon
(74) *Attorney, Agent, or Firm* — Benjamin Diederich; Gresham Savage Nolan & Tilden, PC

(57) ABSTRACT

The management of communications devices on an application service system is disclosed. The communications devices are associated with a user and a subscription account of a wireless service provider as identified by a wireless number. Charge data is received on the application service system from a billing system of the wireless provider. The charge data is for one of the communications devices. The charge data is then saved in a wireless device inventory database that includes one or more device records, each of which is associated with a particular one of the communications devices. The device records are also be defined by a wireless number and a charge record that includes one or more charge identifiers and corresponding charge amounts therefor. The charge data is stored in the device record. A report may be generated from the wireless device inventory database.

16 Claims, 15 Drawing Sheets

(56) References Cited

U.S. PATENT DOCUMENTS

| | | |
|---|---|---|
| 2004/0008672 A1 | 1/2004 | Kobylarz et al. |
| 2006/0270386 A1 | 11/2006 | Yu et al. |
| 2008/0069324 A1* | 3/2008 | Bevente et al. .......... 379/114.22 |
| 2011/0320283 A1* | 12/2011 | Aaron et al. ............... 705/14.64 |
| 2012/0084184 A1* | 4/2012 | Raleigh et al. .................. 705/30 |
| 2013/0065551 A1* | 3/2013 | Raleigh et al. ................ 455/405 |
| 2013/0297492 A1* | 11/2013 | Ertresvaag et al. ............. 705/39 |

* cited by examiner

ACTIVE network | *VIEW MOBILE*     Login    Sign up    Help    Feedback

HOME     PRICING

60 — ( STEP 1 ) - of - 62 — ( STEP 2 )

SET UP YOUR ACCOUNT     *64*

Please fill in the information below to set up your account     * Required Fields

*FIRST NAME [ ] — 66a
*LAST NAME [ ] — 66b
*E-MAIL [ ] — 66c
*PASSWORD [ ] — 66d

- - - - - - - - - - - - - - -
STRENGTH

*CONFIRM PASSWORD [ ] — 66e
*PHONE NUMBER [ ] — 66f
*BUSINESS NAME [ ] — 66g

70 — *☐ I ACCEPT THE <u>TERMS AND CONDITIONS</u>

72 — [ CANCEL ]   or   [ CONTINUE ] — 74

FIG. 4A

ACTIVE network |*VIEW MOBILE*   Login   Sign up   Help   Feedback

HOME   PRICING ( STEP 1 ) - of - ( STEP 2 )

SET UP WIRELESS ACCOUNT *112*

*Set up your account: You are Almost Done! There is some missing data we need you to fix.*

WIRELESS NUMBER [  ] —114a
FIRST NAME [  ] —114b
LAST NAME [  ] —114c
EMAIL [  ] —114d

DEVICE TYPE [ ▽ ] —116
DEPT [ ▽ ]

86— [ BACK ]   or   [ CONTINUE ] —74

FIG. 4E

IMPORT RAW DATA

Set up your account: You are Almost Done! There is some missing data we need you to fix.

▼ JAN-2013 ▲

CARRIER [▼] — 132a
ACCOUNT NUMBER [▼] — 132b
UPLOAD [BROWSE...] — 134

138 — [UPLOAD]

SEARCH: [ ]

Show [10 ▼] entries

| CARRIER | ACCOUNT NUMBER | DATE | IMPORT DATE | DEVICES # |
|---|---|---|---|---|
| CARRIER 1 | 6666666666 | Jan. 13 | 04:17PM 01/30/2013 | 10 |

Showing 1 to 1 of 1 entries

[BACK TO DASHBOARD]

FIG. 6

TOP TEN USERS          *138*

| # | WIRELESS NUMBER | NAME | DEPT | TOTAL |
|---|---|---|---|---|
| 1 | 416-555-2312 | Jim Watson | | $1290.73 |
| 2 | 416-555-1392 | Greg Smith | Market | $344.06 |
| 3 | 416-555-1231 | Joe Bloggs | | $137.83 |
| 4 | 416-555-5412 | Mary Roe | | $80.61 |
| 5 | 416-555-5959 | Jeff Jones | Market | $74.79 |
| 6 | 416-555-8921 | Ben Doe | | $74.62 |
| 7 | 317-555-8591 | Sam Stone | | $74.28 |
| 8 | 213-555-2123 | Larry Rich | | $74.28 |
| 9 | 213-555-3184 | Yvonne Kim | | $68.83 |
| 10 | 949-555-1123 | John Page | | $4.28 |

DEVICES NOT IN USE          *138*

| # | WIRELESS NUMBER | NAME | DEPT |
|---|---|---|---|
| 1 | 410-555-1231 | Jim Smith | |
| 2 | 515-555-1111 | Mary Doe | Market |
| 3 | 515-555-2222 | Larry Stone | |
| 4 | 515-555-9658 | Kate Watson | |
| 5 | 416-555-2113 | Phil Lewis | |
| 6 | 416-555-1959 | Alvin Hall | |

MANAGE DEVICE

EXPORT | IMPORT

*Modify Device Data*

Show [10 ▼] entries                                161 —☐ Show unused devices

| CARRIER | ACCOUNT | WIRELESS NUMBER | FIRST NAME | LAST NAME | TYPE | VALIDATED | ACTION |
|---|---|---|---|---|---|---|---|
| A COMPANY | 66666642 | 416-555-2312 | Jim | Watson | Tablet | ⊗ | ✎ |
| A COMPANY | 68488484 | 416-555-1392 | Greg | Smith |  | ⊗ | ✎ |
| A COMPANY | 69934993 | 416-555-1231 | Joe | Bloggs |  | ⊗ | ✎ |
| A COMPANY | 12359695 | 416-555-5412 | Mary | Roe | Phone | ⊗ | ✎ |
| A COMPANY | 34599694 | 416-555-5959 | Jeff | Jones | Tablet | ⊗ | ✎ |
| A COMPANY | 19959399 | 416-555-8921 | Ben | Doe |  | ✓ | ✎ |
| A COMPANY | 12391992 | 317-555-8591 | Sam | Stone |  | ⊗ | ✎ |
| A COMPANY | 93996591 | 213-555-2123 | Larry | Rich |  | ✓ | ✎ |
| A COMPANY | 12399594 | 213-555-3184 | Yvonne | Kim |  | ✓ | ✎ |
| A COMPANY | 12399579 | 949-555-1123 | John | Page |  | ⊗ | ✎ |

Showing 1 to 10 of 10 entries       ←→

160a

BACK TO DASHBOARD

FIG. 8A

MANAGE DEVICE

EXPORT | IMPORT

*Modify Device Data*

Show [10 ▼] entries                                161 —☒ Show unused devices

| CARRIER | ACCOUNT | WIRELESS NUMBER | FIRST NAME | LAST NAME | TYPE | VALIDATED | ACTION |
|---|---|---|---|---|---|---|---|
| A COMPANY | 59994982 | 410-555-1231 | Jim | Smith |  | ⊗ | ✎ |
| A COMPANY | 12399593 | 515-555-1111 | Mary | Doe |  | ⊗ | ✎ |
| A COMPANY | 59388124 | 515-555-2222 | Larry | Stone |  | ⊗ | ✎ |
| A COMPANY | 56020003 | 515-555-9658 | Kate | Watson |  | ⊗ | ✎ |
| A COMPANY | 15990693 | 416-555-2113 | Phil | Lewis |  | ⊗ | ✎ |
| A COMPANY | 13299391 | 416-555-1959 | Alvin | Hall |  | ⊗ | ✎ |

Showing 1 to 6 of 6 entries       ←→

160b

BACK TO DASHBOARD

FIG. 8B

ENTERPRISE WIRELESS DEVICE USAGE REPORTING

CROSS-REFERENCE TO RELATED APPLICATIONS

This application claims the benefit of U.S. Provisional Application No. 61/696,637, entitled ENTERPRISE WIRELESS USAGE REPORTING SYSTEM and filed Sep. 4, 2012, the entirety of the disclosure of which is incorporated by reference herein.

STATEMENT RE: FEDERALLY SPONSORED RESEARCH/DEVELOPMENT

Not Applicable

BACKGROUND

1. Technical Field

The present disclosure relates generally to accounting and management of information therefor, and more particularly, to reporting usage and billing of enterprise wireless communications devices.

2. Related Art

Mobile wireless communications devices, which refer generally to cellular phones, smart phones, tablets, personal digital assistants, wireless hot spot devices, and so forth, are widely used in contemporary business enterprises, to the point of practical ubiquity. Conventional devices are capable of voice and data communications, and are thus used to place telephone calls, send e-mails and text messages (via the Short Message Service, or SMS), browse the web, and download media, and to perform any other function that involves the transfer of data between the device and a remote system. The capabilities of these devices are almost limitless and find application in facilitating numerous business roles.

These devices have multiple wireless communications modes that serve different purposes. For short range, low data throughput, device-to-device communications such as that for wireless headsets Bluetooth is commonly utilized. For high-speed local area networking with other computers and/or devices, and for connecting the device to the Internet, WiFi (IEEE 802.11x) may be utilized. Although WiFi data links have high data throughput, range tends to be limited. WiFi networks/hotspots are typically found in businesses and homes for linking commonly owned computing resources together and to connect to the Internet. For the most part, the networks are individually managed, and access may be restricted to authorized devices. Extensive efforts to deploy public WiFi networks in a variety of locations have been made. In commercial establishments such as cafes, access may be free, but in public places such as airports, train stations, libraries, and the like, access may be granted only upon payment. Some service providers have deployed WiFi networks in multiple different locations, but each being accessible with a single user account established with the provider.

Although WiFi service is expanding to more locations, cellular-based communications modalities provides the most extensive voice and data coverage. Generally, cellular networks are comprised of a series of sites with short-range transceivers, to which the mobile devices or handsets are linked over established protocols. These protocols are a part of competing families of standards classified under 3GPP (3rd Generation Partnership Project), which relies upon the GSM (Global System for Mobile Communications) standard as its base, and 3GPP2 (3rd Generation Partnership Project 2), which relies upon cdmaOne as its base. The respective fundamental standards have evolved over time with increasing data transfer speeds and network availability. Competing service providers have adopted one standards platform or another, and performance improvements resulting from each enhancement are touted as key differentiators.

In order to accommodate different usage profiles amongst the subscriber base, service providers offer a variety of packages at different price points. Although some subscriptions are pre-paid for a certain amount of airtime with no commitment periods, most subscriptions are two-year commitments and billed on a monthly basis for varying baseline usage. For example, one package may be offered for a minimal number of minutes with the lowest price, while another package may be offered for additional minutes with a higher price. Any usage exceeding the baseline (200 minutes in a month, for example) may be billed at a higher rate per minute. In addition to voice calls, data usage may also be part of the package and tracked/billed the same way.

Mobile wireless subscriptions are typically paid for by individual consumers, even though some business uses may occur. However, an increasing number of companies purchase devices and subscriptions for employees, particularly to salespeople and executives who frequently travel, but must remain in contact with customers and employees alike. Additionally, company-issued devices may be necessary for employees who are critical to operations and must always be reachable in case of emergencies.

With this practice becoming the norm, wireless subscription costs for businesses are growing exponentially. Presently, no solutions exist for reporting on the usage of company-owned devices, though painstaking manual reviews of individual bills on a systematic basis have yielded cost savings of up to 25%. Companies are oftentimes organized or structured according to business functions, with each unit being responsible for its own budget and costs, including mobile subscriptions. Appropriate chargebacks allocating the costs to the incurring unit would be desirable, but again, there are no solutions therefor. This process is further complicated when there are multiple wireless service providers. Accordingly, there is a need in the art for an improved enterprise wireless device usage reporting system and method which can serve as a single consolidation point for managing multiple wireless subscriptions.

BRIEF SUMMARY

An embodiment of the present disclosure is directed to a method for managing communications devices on an application service system. Each of the communications devices may be associated with a user and a subscription account of a wireless service provider. The subscription account may be identified by a wireless number. The method may include receiving charge data on the application service system from a billing system of the wireless provider. The charge data may be for a first one of the communications devices. Thereafter, there may be a step of saving the charge data in a wireless device inventory database connected to the application service system. The wireless device inventory database may include one or more device records, each of which may be associated with a particular one of the communications devices. The device records may also be defined at least by a wireless number and a charge record. In turn, the charge record may include one or more charge identifiers and corresponding charge amounts therefor. The charge data may be stored in the charge record of a one of the device records for the communications device as designated by a device identifier included in the charge data. The method may further include generating a report on the application service system. The report may be generated from the wireless device inventory database based upon at least a portion of an aggregate of data stored in the one of the device records.

Certain other embodiments of the present disclosure contemplate respective computer-readable program storage media that each tangibly embodies one or more programs of instructions executable by a data processing device to perform the foregoing method. The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIGS. 4A-4F are screen shots showing the user interface of a setup wizard to configure the wireless device usage monitoring system;

FIG. 6 is a screen shot of the user interface for uploading raw charge data;

FIGS. 7A-7E show an exemplary dashboard interface that summarizes wireless device usage; and FIGS. 8A-8B show an exemplary device management interface in accordance with one embodiment of the present disclosure.

Common reference numerals are used throughout the drawings and the detailed description to indicate the same elements.

DETAILED DESCRIPTION

The detailed description set forth below in connection with the appended drawings is intended as a description of the presently preferred embodiment of the managing communications devices, and is not intended to represent the only form in which the present method may be developed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first, second, and the like are used solely to distinguish one from another entity without necessarily requiring or implying any actual such relationship or order between such entities.

Figure 1:
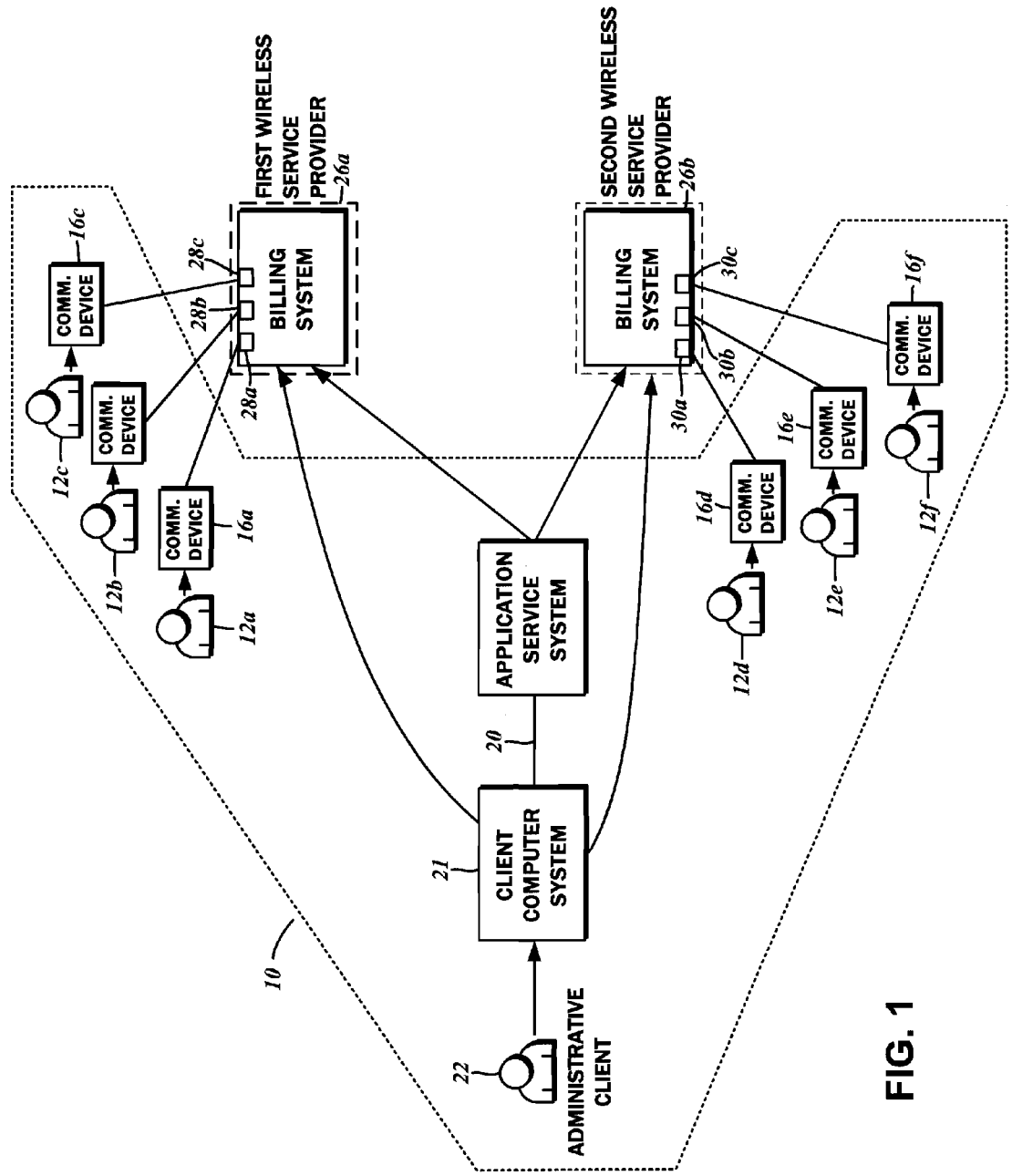
FIG. 1 is a block diagram illustrating various components of a wireless device usage monitoring system in accordance with one embodiment of the present disclosure.
Figure 2:
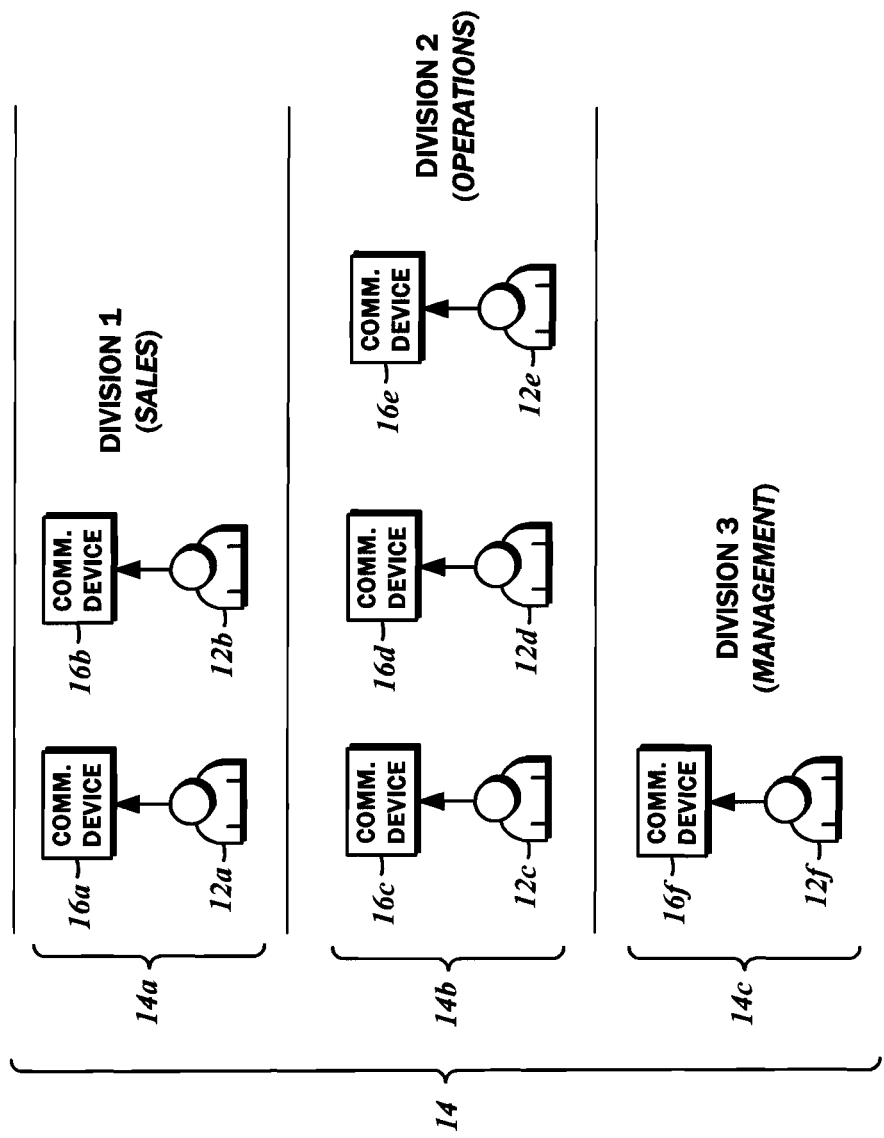
FIG. 2 is a block diagram showing users separated into different divisions as would be typical in a business enterprise.

With reference to the block diagram of FIG. 1, one embodiment of the present disclosure contemplates a single consolidation point for an enterprise 10 to manage multiple wireless subscriptions. In further detail, the enterprise 10 may have multiple employees, also referred to as users 12. As more particularly illustrated in the block diagram of FIG. 2, the employees may be separated into one or more divisions 14 on the basis of job function or other organizational partition. For example, there may be a first division 14a comprised of salespersons, including a first user 12a and a second user 12b. Furthermore, a second division 14b may be comprised of operations personnel, including a third user 12c, a fourth user 12d, and a fifth user 12e. Finally a third division 14c may be management, comprised of a sixth user 12f.

Each of the users 12a-12f have respective communications devices 16a-16f. As referenced herein, communications device 16 is understood to be any wireless mobile device such as a cellular phone, smart phone, tablet, laptop with cellular network connectivity, and so forth. It is not intended to be limited to any particular type of communications, form factor, or any other characteristic. In the context of the present disclosure, which is generally directed to the management of mobile device subscriptions, the communications device 16 is understood to be any device that relies upon a wireless service provider for data communications. Along these lines, as utilized herein, the term subscription refers broadly to an ongoing relationship between the user 12 and a service provider, and does not necessarily require for there to be a formal contractual arrangement with duration commitments. Although preferred embodiments of the present disclosure can be used for managing such contractual arrangements, other alternative wireless service arrangements such as prepaid accounts and pay-as-you-go type accounts may also be handled. In this regard, the term subscription refers to any such arrangement.

According to one exemplary embodiment, the budgets of each division 14a-14c are separate and independent of the others with separate account payables and receivables. Thus, expenses such as mobile device subscriptions may be separately handled amongst the various divisions 14. In addition to the foregoing divisions 14, secondary divisions such as one drawn along specific markets or industries (where the enterprise 10 deals with multiple markets or industries), with personnel being assigned to one or more such secondary divisions, are also possible within the enterprise. Those having ordinary skill in the art will recognize that the foregoing divisions 14 are presented by way of example only and not of limitation. While the present disclosure considers various features in relation to only one set of divisions 14, it is to be understood that those features are adaptable to such additional divisions 14 within the enterprise 10.

Referring again to the block diagram of FIG. 1, according to one embodiment, an application service system 18 is understood to be the aforementioned single consolidation point. The application service system 18 may be a conventional server computer system that executes pre-programmed instructions of a software application embodying a method for managing the communications devices 16. It is understood that, like any other conventional computer, the server computer system has a processor, data storage, and a network link 20 to communicate with, for example, an administrative client computer system 21. An administrative user 22, who is someone within the enterprise 10 responsible for managing the communications devices 16, can use the client computer system 21 to access the functionality implemented on the application service system 18 to perform appurtenant tasks.

In this regard, the software application is implemented as a remote service (SaaS, or Software as a Service) with a consistent user interface that does not depend on the specifics of the client computer system 21. In one implementation, the software application is web-based, that is, the application service system 18 further includes a web server, and various interface pages populated with stored data are transmitted to the client computer system 21 in response to requests generated thereby. The function of generating the interface pages and the flow of user interaction is governed by the execution of the application, while the low-level mechanics of transmitting the content in a predetermined format for proper rendering on the client computer system 21 is implemented by the web server.

On the side of the client computer system 21, there is understood to be a web browser application running thereon that can generate appropriately formatted requests to the web server on the application service system 18 and receive and render the content transmitted by the web server. Thus, the client computer system 21 is similarly understood to be a conventional computing device with a processor, data storage, and network connectivity. The operation of web servers and web browsers is well known in the art, so no further consideration as to the details will be discussed herein. A familiar interface with readily recognizable interactive elements is understood to make routine tasks involved with the management of communications devices 16 easier for the administrative user 22, who may not necessarily have extensive expertise. Furthermore, the centralized nature of the application service system 18 permits other administrative users 22 from possibly other divisions 14 of the enterprise 10 to access the same.

As indicated above, wireless connectivity for the communications devices 16 rely upon dispersed cellular network sites that are operated by various wireless service providers 24. In the illustrated example of FIG. 1, there are two: a first wireless service provider 24a and a second wireless service provider 24b that are competitors to each other. Completely independent of the divisions 14 within the enterprise 10, by way of example, the first, second and third communications devices 16a, 16b, and 16c, respectively, are associated with the first wireless service provider 24a, while the fourth, fifth, and sixth communications devices 16d, 16e, 16f, respectively, are associated with the second wireless service provider 24b.

Systems for accurately tracking and billing for usage of the communications devices 16 are known in the art, and may be comprised of several discrete yet interconnected systems. Conventionally, end-user presentation of bills and acceptance of payments therefor are handled by a billing system 26, which may similarly be a web-based application. Aside from retrieving raw usage data, the billing system 26 may have little connection to the tracking systems that are part of the cellular network infrastructure. For connectivity purposes, each communications device 16 that is part of the network is identified by a permanent unique code, known as an IMEI (International Mobile Station Equipment Identifier). For billing purposes, however, it may be more convenient to identify account holders or users 12 based upon its telephone number.

Each of the users 12 have an account on the billing system 26. The first billing system 26a for the first wireless service provider 24a includes a first subscription account 28a associated with the first communications device 16a and the first user 12a, a second subscription account 28b associated with the second communications device 16b and the second user 12b, and a third subscription account 28c associated with the third communications device 16c and the third user 13c. Likewise, the second billing system 26b for the second wireless service provider 24b includes a first subscription account 30a associated with the fourth communications device 16d and the fourth user 12d, a second subscription account 30b associated with the fifth communications device 16e and the fifth user 12e, and a third subscription account 30c associated with the sixth communications device 16f and the sixth user 12f. Each of the foregoing subscription accounts 28, 30 are understood to be uniquely identified by the respective telephone numbers. Furthermore, one account may have associated therewith more than one communications device 16. Again, the various subscription accounts 28, 30 mentioned above are presented by way of example only and not of limitation.

The present disclosure contemplates aggregating usage data otherwise provided by the billing systems 26 to the users 12 and storing the same in a master database of accounts. From this database, it is possible for the application service system 18 to generate meaningful and actionable reports to the users 12, as well as those supervisory personnel managing different divisions 14 within the enterprise 10, and finance teams. The improved visibility is envisioned to reduce costs, and provide a more streamlined process for chargebacks, where the subscription costs are allocated to specific divisions 14. As utilized herein, the term chargeback is understood to refer to such cost allocations to different divisions of the enterprise 10. Additionally, however, the term is also intended to encompass showbacks, where costs are presented to the divisions 14 for more transparency without necessarily charging the costs to that division for budgetary management purposes.

Figure 3:
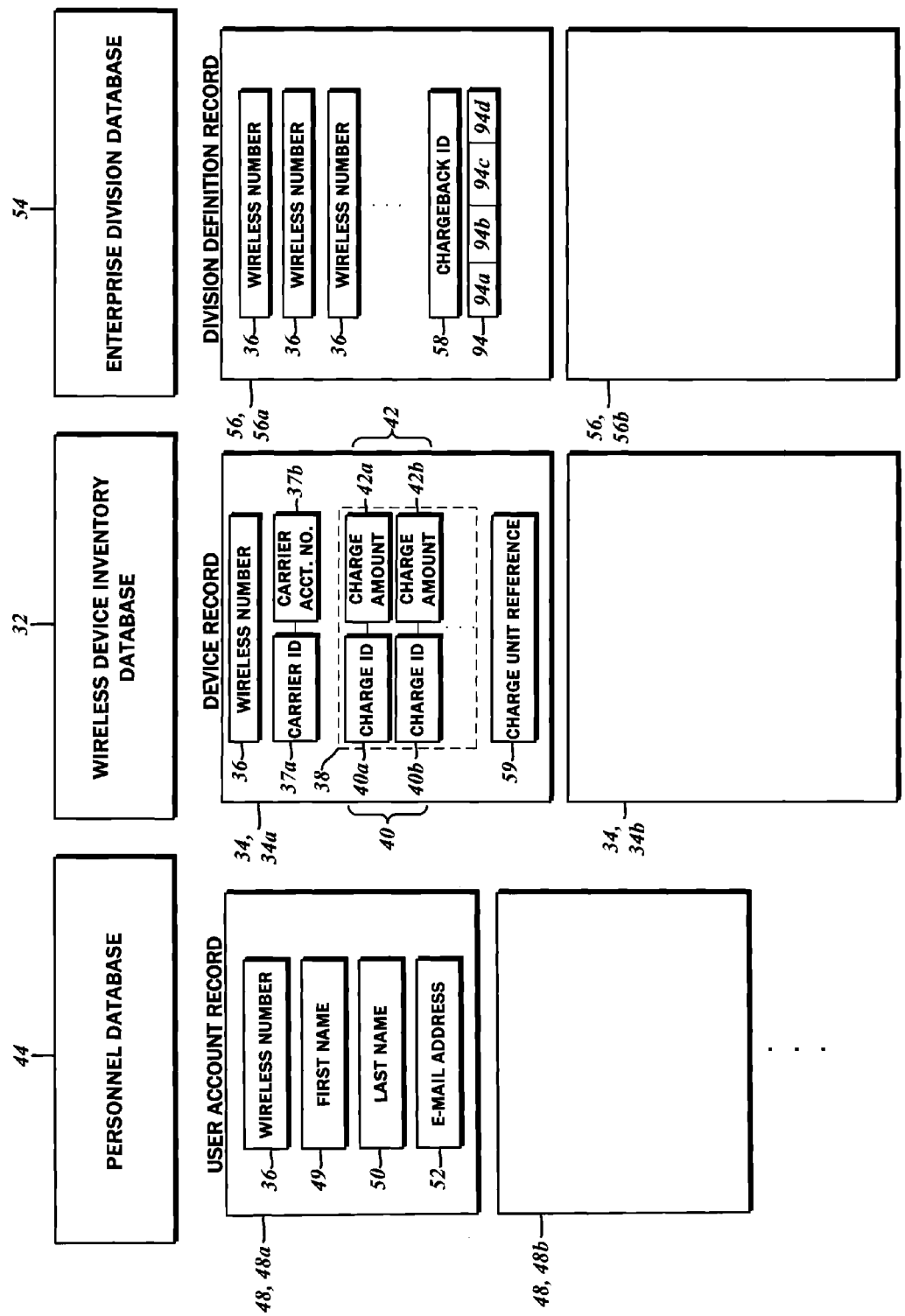
FIG. 3 is a block diagram of the database components of the wireless device usage monitoring system including a wireless device inventory database, a personnel database, and an enterprise division database.

The block diagram of FIG. 3 further illustrates the configuration of the application service system 18, and more particularly, the aforementioned database. In one embodiment, there is a wireless device inventory database 32 that is connected to or otherwise associated with the application service system 18. As suggested by its nomenclature, the wireless device inventory database 32 includes one or more device records 34, each of which are associated with a respective one of the communications devices 16 that are being managed within the enterprise 10. Although only two of the device records 34a, 34b are shown, the wireless device inventory database 32 is understood to include device records 34 for all of the communications devices 16.

At a minimum, the device records 34 are defined by a wireless number 36, a wireless service provider identifier 37a a subscription account identifier 37b, and a charge record 38. The wireless service provider identifier 37a and the subscription account identifier 37b, referred to in the aggregate as the service provider account information 37, are useful in organizing a plurality of communications devices 16 that are under a single wireless subscription account 28, 30. The charge record 38 includes one or more charge identifiers 40 and corresponding charge amounts 42. In particular, the example charge record 38 has a first charge identifier 40a with a first charge amount 42a, and a second charge identifier 40b with a second charge amount 42b. To the extent there are communications devices 16 of multiple wireless carriers being managed, an additional provider identifier 43 may be included. Additional exemplar details of the types of information for the charge identifier 40 will be discussed below, when considering the usage data that is produced by and retrieved from the billing system 26.

The embodiment of the application service system 18 shown in FIG. 3 further includes a personnel database 44 that stores user account records 48. Again, although only two particular user account records 48a, 48b are shown, the personnel database 44 is understood to include user records 48 for all of the users 12 with communications devices 16 that are being managed within the enterprise 10 by the application service system 18. Each of the accounts 48 includes the wireless number(s) 36 and/or the corresponding service provider account information 37 of all communications devices 16 thereunder, as well as a first name 49, a last name 50, and an e-mail address 52. Generally, the wireless number 36 is understood to encompass any unique identifier that designates or otherwise identifies the communications device 16 and/or the accounts 28,30. Additional information about the users 12 may be collected and stored in the user account records 48, and the foregoing details are intended to be exemplary only.

In addition to the wireless device inventory database 32 and the personnel database 44, there is an enterprise division database 54 comprised of one or more division definition records 56. By way of example, the division definition records 56 are understood to define which of the communications devices 16 are part of which one of the divisions 14. To this end, the division definition records 56 include a listing of the telephone numbers 36 that are to be part of that division 14. For instance, suppose the first division definition record 56a corresponds to the first division 14a. Since the first communications device 16a, the second communications device 16b, and the third communications device 16c are each part of the first division 14a, the first division definition record 56a contains a listing of corresponding wireless numbers 36 for those devices. Utilizing multiple division definition records, e.g. the second division definition record 56b, multiple divisions 14 may be defined. To uniquely identify each of the division definition records 56, there may be a chargeback identifier 58 that may be a simple code that identifies the division 14.

The common data element across the wireless device inventory database 32, the personnel database 44, and the enterprise division database 54 is the wireless number 36 which can serve as the index by which all other data stored in the application service system 18 can be accessed. In the alternative, the service provider account information 37 may be utilized for this purpose. Additionally, when the databases are so configured, cross-referencing fields may be included in the various records to link to related data in other databases. For example, the device record 34 may also include a charge unit reference 59, which is associated with the chargeback identifier 58 of the division definition record 56. The charge unit reference 59 can denote the division(s) 14 of which that communications device 16 is a member. Those having ordinary skill in the art will recognize the several possible ways by which referential integrity may be maintained across the databases. Notwithstanding the foregoing, all of the above-mentioned information can be stored and organized in a single database in a flat-record type of arrangement, and the basic functions of the method for managing the communications devices 16 can be achieved with such minimal complexity. The presented configuration is exemplary only, and not intended to be limiting.

In one embodiment, the application service system 18 is deployed as a web-based service that can be accessed by multiple users simultaneously. It is expressly contemplated that the service is scalable beyond just the single enterprise 10, and can have different restricted access accounts where solely the data of the enterprise 10 for which the account is set up is visible to the personnel affiliated therewith. Along these lines, the visual appearance of the various user interfaces discussed below may be customized with enterprise-specific logos, color schemes, and other "look-and-feel" elements. Depending on the feature needs of the enterprise 10, differing payment plans for accessing the service may be implemented. With reference to FIGS. 4A-4F, the initial setup for such enterprise accounts is a guided wizard that presents various screens with input forms that are sequentially completed by the administrative user 22.

Generally, the wizard is segregated into two major steps, as indicated by a first step indicator icon 60 and a second step indicator icon 62, both of which are generated on a first setup screen 64. Information that is typically for setting up online accounts is requested, such as a first name in a text input field 66a, a last name in a text input field 66b, an e-mail address in a text input field 66c, an account password and confirmation in text input fields 66d, 66e, a telephone number in a text input field 66f, and a business name in a text input field 66g. Passwords are understood to have varying strength levels depending on the characters and sequences therein, and an indicator 68 can also be presented to encourage the administrative user 22 to select a robust one. Setting up an online account requires the user to accept certain terms that cover acceptable and unacceptable uses, privacy issues, and so forth, and in acknowledgement of these terms, a checkbox 70 is activated before continuing to the next step in the process. The data entered in the text input fields 66 can be discarded and the account setup process voided by activating a cancel button 72. Otherwise, a continue button 74 can be activated to proceed to the next step.

Figure 4B:
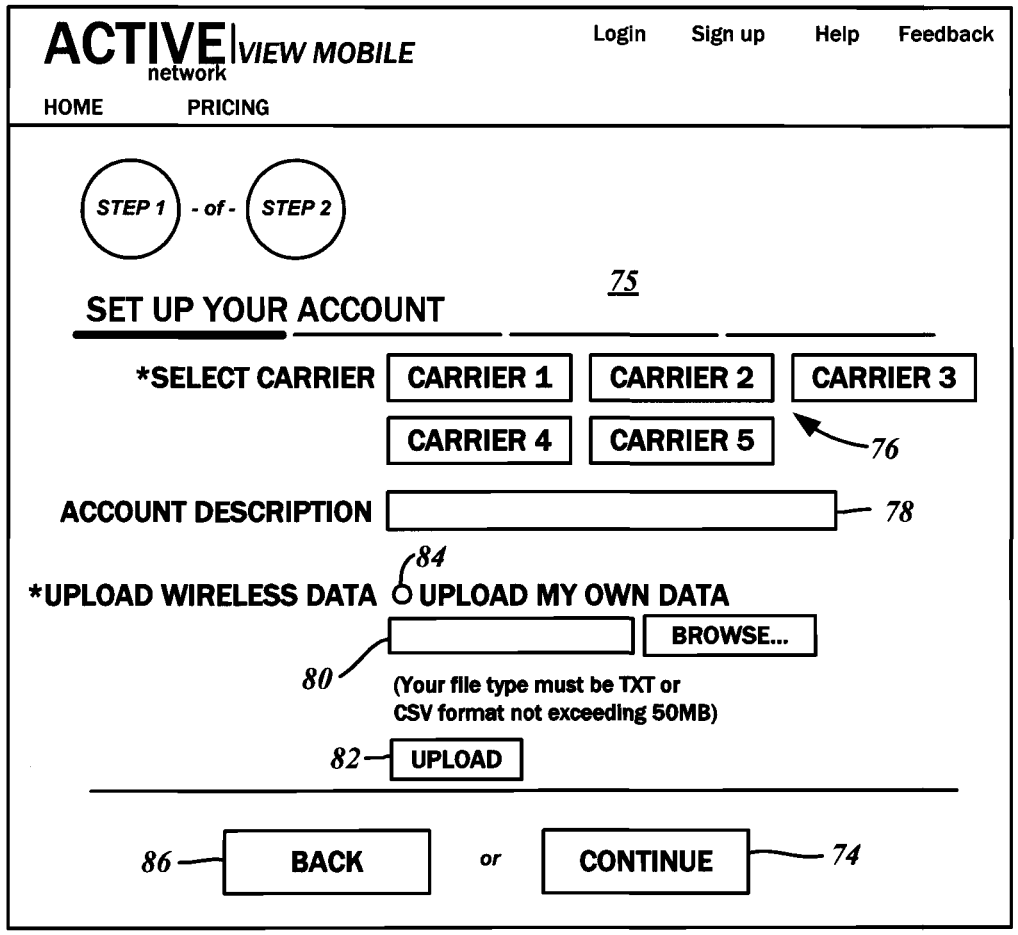
Figure 4C:
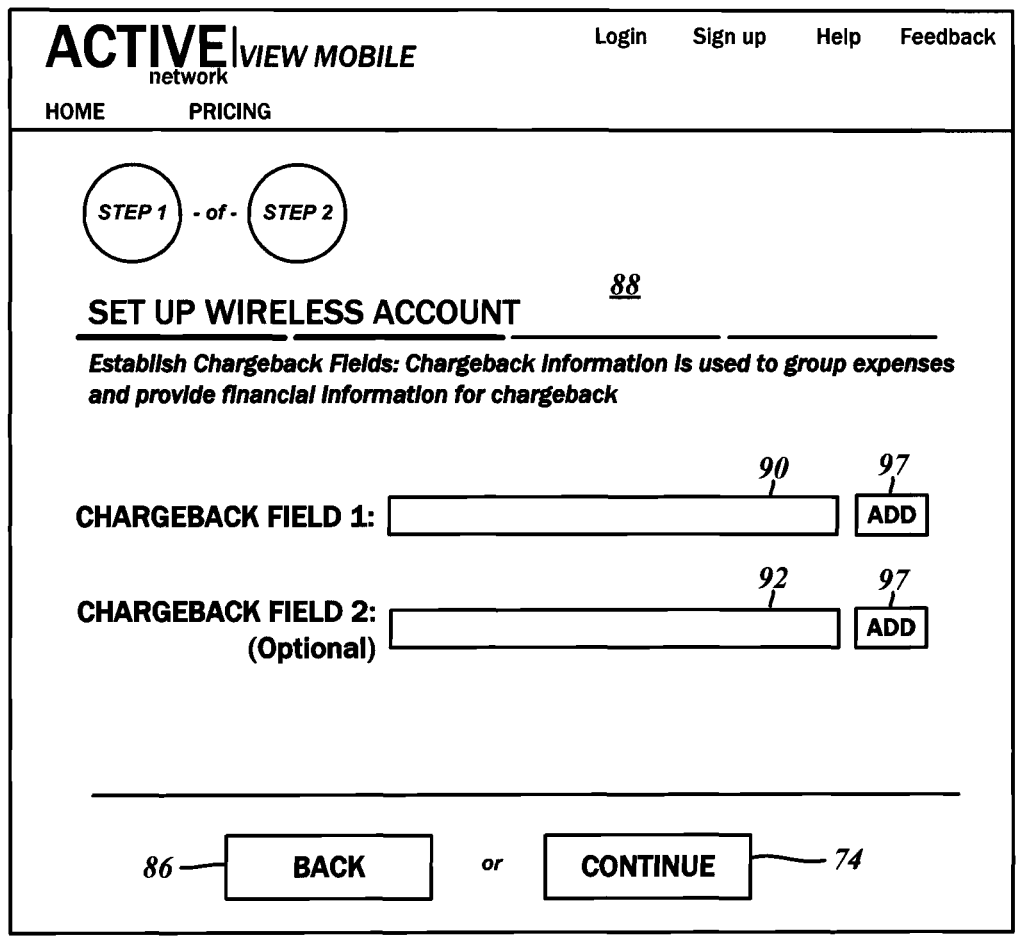

With reference to a second setup screen 64 shown in FIG. 4B, additional details pertaining to a first one of the communications devices 16 and the corresponding subscription account is requested. The presently contemplated embodiments are configured for usage data from one of several carriers, the company logos with activatable links/selections 76 of which are displayed in the second setup screen 75. A user-designated descriptor for the subscription account may be input in a text input field 78. If the administrative user 22 currently has raw usage data downloaded from the billing system 26, then a file containing the same stored on the local file system, i.e., the hard drive of the client computer system 21, can be specified in a file designation field 80. Once the file is designated, an upload button 82 can be selected to begin the process of transferring the specified file to the application service system 18. Upon the designated file being received by the application service system 18, it is compared against the master database to ensure that all of the information needed for reporting in accordance with the various embodiments is present.

Because the identity of the carrier can be ascertained from such a file, there is understood to be no need to designate the carrier via the activatable links 76. Accordingly, the selection may be limited to one or the other of the activatable links 76 or a radio button 84, the selection of which renders active the file designation field 80. Once the selection is made, the continue button 74 can be activated to proceed to the next step. Alternatively, to return to the first setup screen 64, a back button 86 can be activated.

As briefly indicated above, various embodiments of the present disclosure include the functionality of assigning mobile device subscription costs to a specific division 14 within the enterprise 10. The designation of the division 14 is made via the aforementioned chargeback identifier 58 and/or the charge unit reference 59. The values therefor can be entered in a first chargeback input field 90 generated on a third setup screen 88. Continuing with the earlier introduced example shown in FIG. 2, either the first division 14a (sales), the second division 14b (operations) or the third division 14c (management) can be specified in the first chargeback input field 90. Also as mentioned above, an alternative grouping of users 12 apart from these may be simultaneously defined. These alternative divisions 14 may be specified in a second chargeback input field 92.

With additional reference to FIG. 3, the data input in the chargeback input fields 90, 92 are understood to be references or identifiers to chargeback records 94 that include additional details that further define those records. There may be one or more chargeback records 94 that include such information as a descriptor 94a, owner name 94b, owner e-mail 94c, and an activation status 94d. If the chargeback record 94 already exists, merely referencing the chargeback identifier 58 in the chargeback input fields 90, 92 is operative to designate the user account for the first one of the communications devices 16 to that division 14.

Figure 4D:
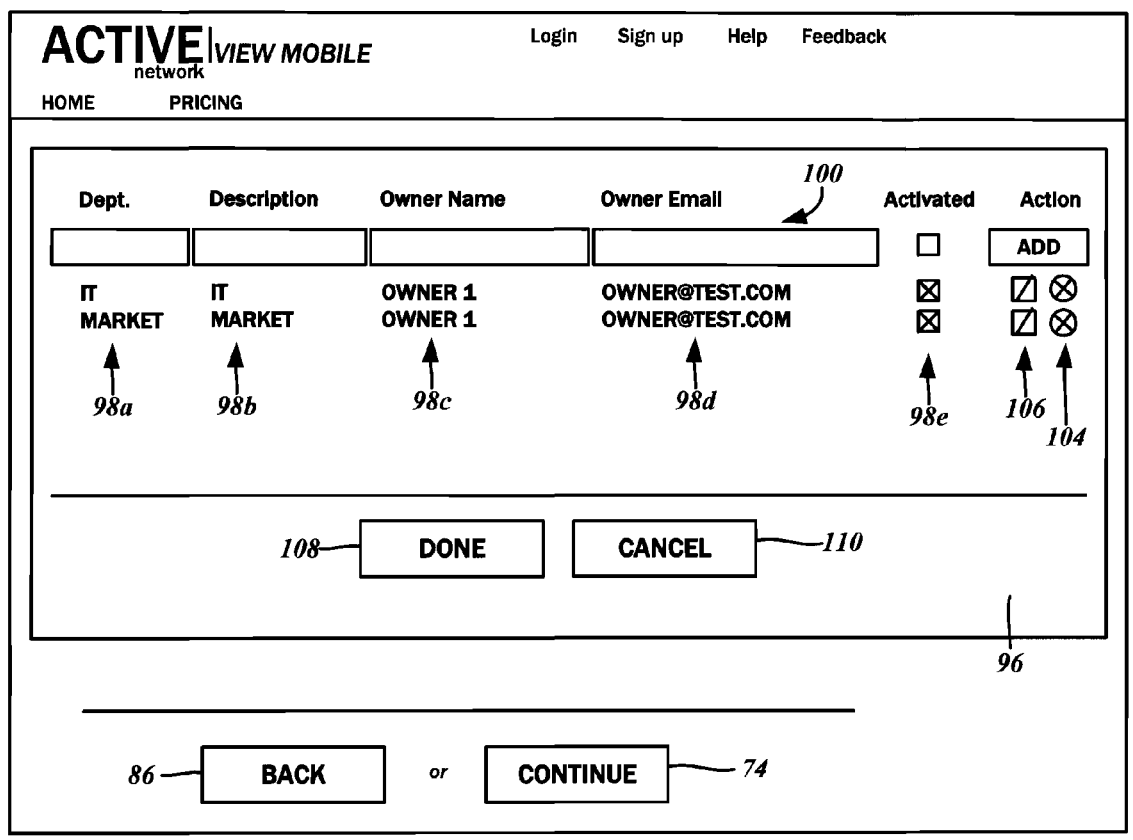

If no such records exist, an overlaid form 96 for inputting such data may be generated on the third setup screen 88 as shown in FIG. 4D upon selecting an add button 97. Existing chargeback records 94 are shown in table form, with the chargeback identifier 58 listed in a first column 98a, the descriptor 94a listed in a second column 98b, the owner name 94b listed in a third column 98c, the owner e-mail 94c listed in a fourth column 98d, and the activation status 94d listed in a fifth column 94e. In further detail, the activation status 94d is represented as a checked or unchecked checkbox, which designated whether the chargeback identifier 58 can be used or not. At the top of each of the columns 98a-98e are new entry input fields 100 where new chargeback records 94 can be defined. Upon entering the data into the new entry input fields 100, an add button 102 can be selected to commit the additions to the enterprise division database 54 or other suitable data store. Thereafter, the new chargeback record 94 can be displayed in the table. It is possible to delete or edit existing data through a delete button 104 or an edit button 106, respectively. When the edit button 108 is selected, the new entry input fields 100 are populated with that record and is therefore editable.

Once any needed operations are performed, it is possible to return to the third setup screen 88 by selecting a done button 108, which commits any unsaved changes or a cancel button 110, which discards any unsaved changes. Upon returning to the third setup screen 88, the designations of the chargeback identifiers 58 may be saved and the wizard can proceed to the next step by activating the continue button 74. The wizard can return to the second setup screen 75 by activating the back button 86.

FIG. 4E illustrates a fourth setup screen 112 in which additional details pertaining to the subscription account are specified. These details include the wireless number 36 that is specified in a text input field 114a. Furthermore, the first name, last name, and e-mail address of the user 12 to which the first one of the communications devices 16 is issued is specified in text input fields 114b-114d. The type of the communications device 16 is specified via a pull-down menu 116. A variety of communications devices 16 may be specified, and by way of example only and not of limitation, may be smart phones, conventional cellular phones, tablets, hotspot devices, and so forth as discussed above. After inputting this information, the wizard can proceed to the next step by activating the continue button 74, and return to the third setup screen 88 by activating the back button 86.

Figure 4F:
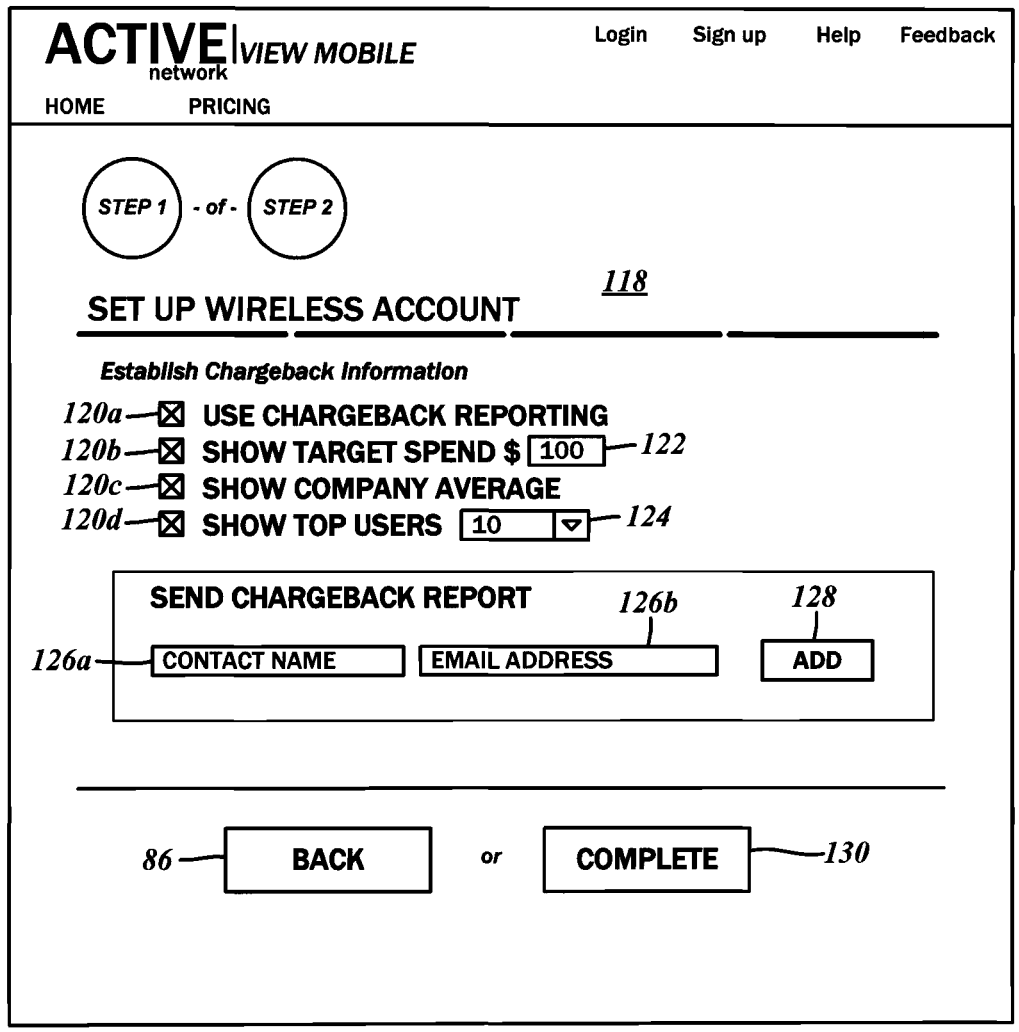

The wizard then continues to a fifth setup screen 118 as shown in FIG. 4F. When raw usage data from the billing system 26 is uploaded while the wizard is in the second setup screen 75, the wizard skips to the fifth setup screen 118. Here, additional details and preferences for trending and chargeback are provided. A first checkbox 120a designates whether chargeback reporting is utilized or not, and a target spending may be activated with a second checkbox 120b. The actual amount of the target may be specified in a text input field 122. Furthermore, preferences for the reporting functionality including showing the enterprise average is activated with a third checkbox 120c, and showing the top users in terms of usage is activated with a fourth checkbox 120d. A variable number of top users to report may be specified in a pull-down menu 124. According to some embodiments, it is possible to send chargeback reports to administrative users 22. Because there may be multiple administrative users 22 (for example, one per division 14), and it would be beneficial to send messages to relevant users only, the recipient may be set on a per-subscription account basis. The name of the administrative user 22 is specified in a first text input field 126a, and that user's e-mail address is specified in a second text input field 126b. Multiple administrative users 22 may be assigned to a single subscription account, and additional ones may be specified by selecting an add button 128. The wizard completes the setup process upon activating a complete button 130, and returns to the fourth setup screen 112 by activating the back button 86.

It is to be understood that the foregoing sequence, appearance, and contents of the wizard is presented by way of example only and not of limitation. Any other suitable interface that solicits more or less data while still achieving the same functionality discussed herein may be readily substituted without departing from the scope of the present disclosure.

Figure 5:
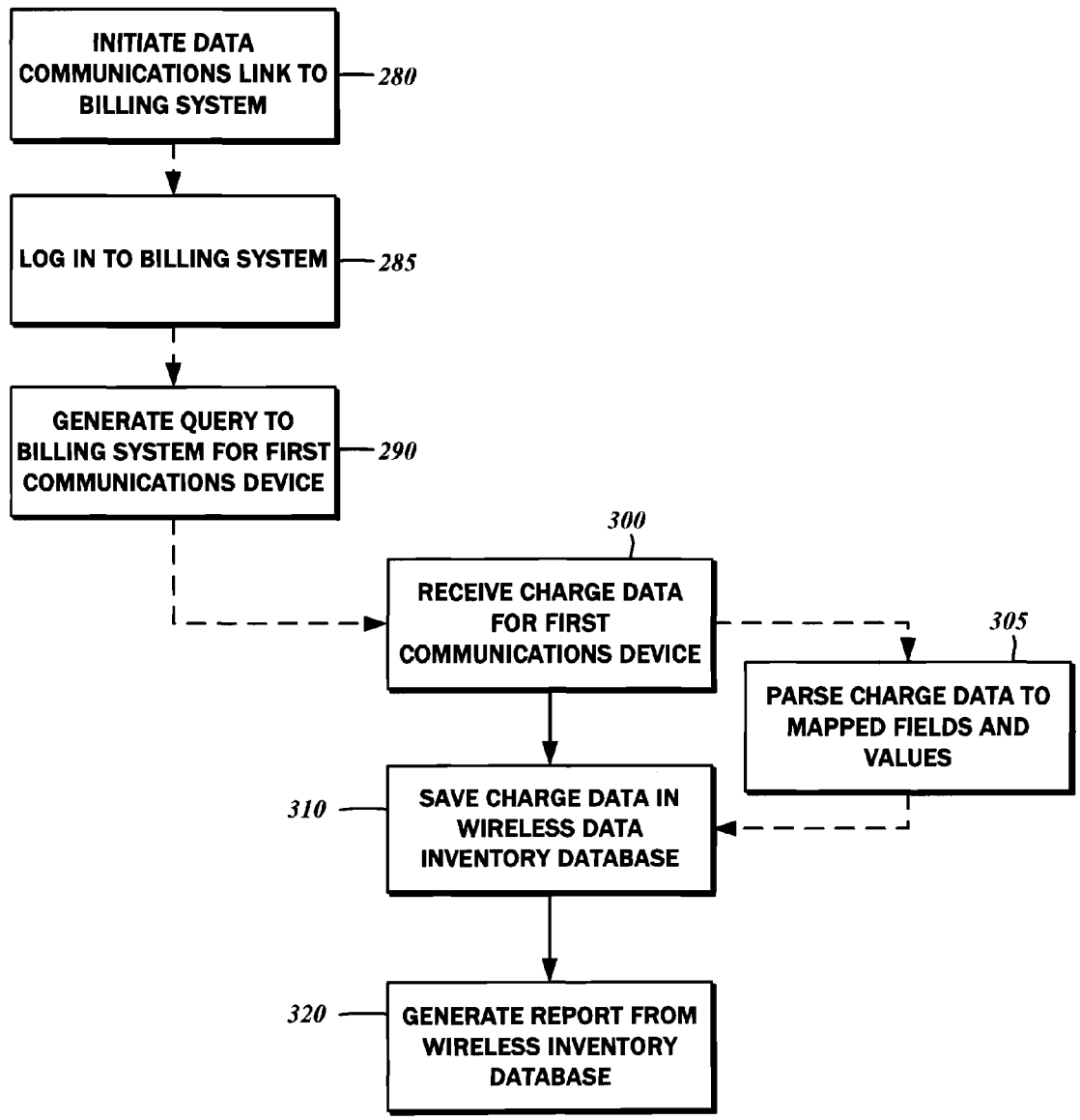
FIG. 5 is a flowchart illustrating an exemplary method for managing one or more communications devices.

Various embodiments of the present disclosure also contemplate a method for managing communications devices on the application service system 18. With reference to the flowchart of FIG. 5, the method may begin with a step 300 of receiving charge data from the billing system 26 for a first one of the communications devices. As utilized herein, the term charge data is understood to refer to any data provided by the billing system 26 that pertains to billing for the communications device 16. This includes fees assessed by the wireless service provider 24 for different usage tiers, supplemental fees assessed for additional usage beyond subscription limits of usage tiers, as well as usage metrics such as bytes/kilobytes/megabytes of data, talk or airtime and so forth. As will be described more fully below, this charge data is parsed to various charge records 38 stored in the wireless device inventory database 32.

In some cases, the billing system 26 provides an application programming interface (API) that allows direct access for automated systems such as the application service system 18 for the charge data. More particularly, the application service system 18 is understood to interact with the billing system 26 over the API to receive the charge data for direct transfer into respective charge identifiers 40 and charge amounts 42 of the device records 34 for the communications device 16 to which the charge data pertains. However, even when an API to directly access the charge data on the billing system 26 is not provided, it may be possible to automate the steps of obtaining data and routing the same to the appropriate records on the databases with preprogrammed scripts and the like.

Where such automation is contemplated, the method may include an optional precursor step 290 of generating a query to the billing system 26. The query is understood to be for the first communications device 16, and optionally, the query may be based upon the wireless number 36. The query may also be based on the service provider account information 37. Any other suitable query to identify the particular subscription account 28, 30 such as account number, IMEI number, or another identifier may be substituted without departing from the scope of the present disclosure. When there are multiple subscription accounts 28, 30 in one billing system, all of the charge data pertaining to the enterprise 10 may be retrieved at once. In such case, the query may be based upon an enterprise account identifier. The charge data received in the step 300 is understood to be responsive to this query. In order to so interact directly with the billing system 26, there may be an additional step 280 of initiating a data communications link from the application service system 18 to the billing system 26, followed by a step 285 of logging in to the billing system 26 with administrator credentials that are associated with the enterprise 10. To the extent there are additional billing systems 26, the foregoing steps 280, 285, 290 and 300 may be repeated.

If automation of retrieving the charge data is not possible or practical, an alternative is manual downloading. In such case, the administrative user 22 manually logs in to the billing system 26, and directs the same to generate and transmit the charge data. This task may be repeated for each of the billing systems 26 for the wireless service providers 24 that is utilized by the enterprise 10. The resultant file that is downloaded to the client computer system 21 may be in a raw format that lacks direct correspondence to the respective charge identifiers 40 and charge amounts 42 of the communications device 16 to which the charge data pertains. One exemplary interface for uploading such data files is shown in FIG. 6. There is a first pull-down menu 132a that defines the wireless service provider 24 from which the data was downloaded, along with a second pull-down menu 132b that defines the account number. The data file is specified in a file designation field 134, and upon selecting an upload button 136, it is transmitted to the application service system 18. To accommodate alternatively formatted/structured data, the method may include an optional step 305 of parsing the received charge data in the raw format to mapped fields and values corresponding to the respective charge identifiers 40 and charge amounts 42. Different billing systems 26 may format the charge data differently, and provide fewer or greater level of detail. One wireless carrier provides extensive data, per the following fields:

Monthly service fee
Data monthly service fee
Text messaging monthly service fee
Activation fee
Call display
Voicemail
911 fee
Directory assistance
System access fee
Essential value packs
Equipment charges
Airtime overage charge
Canadian long-distance charge
US long-distance charge
International long-distance charge
US airtime roaming charges
International airtime roaming charges
US roaming long-distance charge
International roaming long-distance charge
Non-roaming text sent charges
Non-roaming text received charges
Roaming text sent charges
Roaming text received charges
Data overage charges
International data roaming charges
Early cancellation payment
Premium services
Other charges
Credits and discounts
Wi-Fi hotspot charges
UMA US voice charges
UMA international voice charges
UMA US voice roaming tax
UMA international voice roaming tax
UMA local charges
UMA long distance charges
MMS Canadian charges
MMS US/international charges
GST
PST
HST
QST However, another carrier provides charge data in the following structured format:

Item Description
Item Type
Item Category
Charge

Still further, yet another carrier provides the charge data in the following format:

Prorated charge
Monthly charge
Amount
Total
Total charge
Monthly service
Usage charge
Credits adjustments and other charge
Government fees and taxes
Non-communications related charge The method then continues with a step 310 of saving the charge data to the wireless device inventory database 32. More particularly, the charge data is stored in the charge record 38 of a one of the one or more device records 34 for the communications device 16 as designated by a device identifier included in the charge data. The device identifier may be the wireless number 36 in accordance with one embodiment of the present disclosure, or any other suitable data. Via the device record 34, and more particularly charge unit reference 59 thereof, the appropriate division 14 to which the costs are allocated is defined.

In accordance with various embodiments of the present disclosure, the method also contemplates a step 320 of generating a report from the wireless device inventory database 32. Furthermore, the report may be based upon at least a portion of an aggregate of data stored in the device records 34, and provides accurate usage data directly to administrative users 22 and regular users 12 alike on how much is being spent on wireless services. As best shown in FIG. 7, one example implementation of such report is a dashboard 138. Generally, the dashboard 138 shows trends of wireless charges, user accounts, last bill amounts, total number of devices, spend by wireless service provider, device breakouts, top users, and analytics to identify optimization of accounts that would flag the communications devices 16 not used in the last 30, 60, and 90 days.

The dashboard 138 is divided into multiple segments. There is a numerical summary section 140 with a total charges gauge 142 showing the total amount charged across all subscription accounts in the enterprise 10 for a given month as indicated. For comparison purposes, the total amount charged in a previous month is also shown, as is a trend sign 144a that shows either a downward or upward arrow to correspond to the decreasing or increasing cost trends. The numerical summary section 140 also includes an employee average charge gauge 146 for the indicated month, the average charged in a previous month, and a trend sign 144b. Finally, there is a device number gauge 148 that indicates the total number of communications devices 16 being managed by the application service system 18, the number in a previous month, and a trend sign 144c.

Referring now to FIG. 7, the dashboard 138 includes an account management section 150 that includes a listing 152 of all subscription accounts 28, 30 being managed by the application service system 18. As shown, the listing 152 includes multiple columns with different data therein, including account identifiers, total charges, the number of devices under the account, and so forth. New subscription accounts may be added by selecting an add new account button 154. This may invoke the same wizard discussed above in relation to adding accounts; having already discussed those details, they will be omitted here. There is a manage device button 156 that, when selected, invokes a device management interface 158.

As shown in FIG. 8A, the device management interface 158 includes a listing 160a of all communications devices 16 that are being handled by the application service system 18. The device management interface 158 includes a checkbox 161 for showing and hiding unused devices. When checked as shown in FIG. 8B, the active communications devices 16 are hidden, and only those that are unused is shown in a listing 160b. Unused, as referenced herein, may be identified by searching for charge records 38 without usage metrics that do not exceed a predetermined threshold.

Figure 7A:
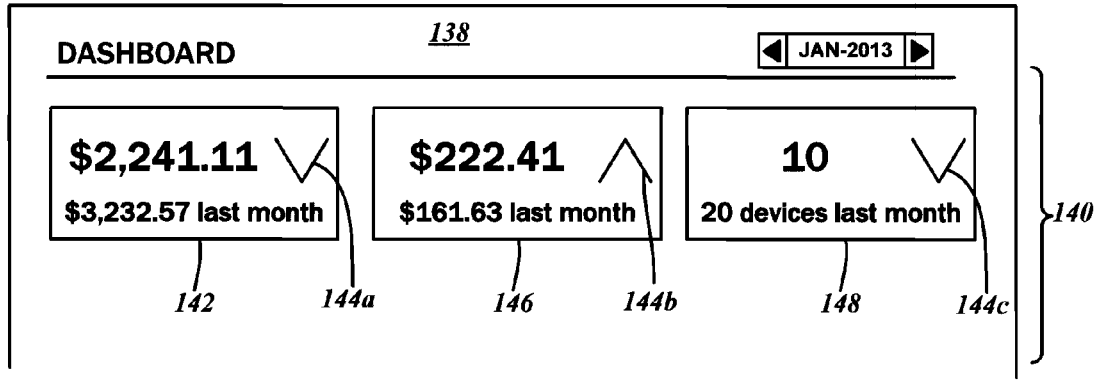
Figure 7B:
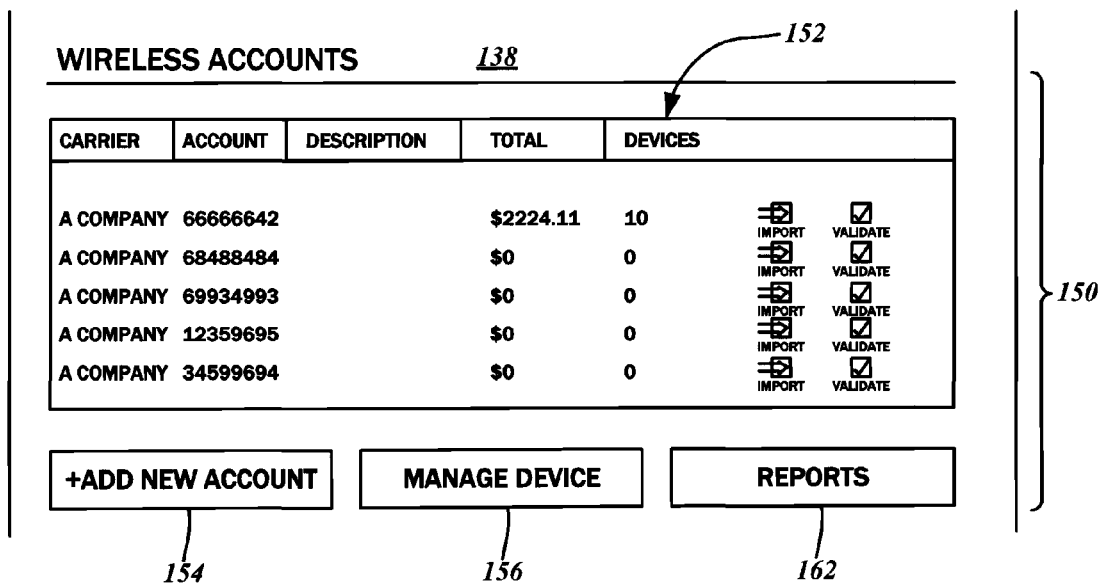

Returning to the dashboard 138 shown in FIG. 7B, the account management section 150 further includes a report button 162. According to various embodiments of the present disclosure, the method also contemplates the generating of tailored reports to various users 12 and administrative users 22. One type of report that can be generated is specific to one user 12 or account holder, and generates usage data of each of the communications devices 16 under a single account. Another type of report that can be generated is a division report for all communications devices 16 that are part of a single division 14. Such a report may be derived from the aggregate of data stored in the one or more device records with common chargeback identifier values 58 that are associated with the specific division 14. Furthermore, a finance report for all communications devices 16 managed by the enterprise 10 may also be generated. This report is an aggregate of all data stored in the device records 34. These reports are understood to provide a greater level of transparency to all levels of personnel for targeting excessive wireless usage and costs.

Figure 7C:
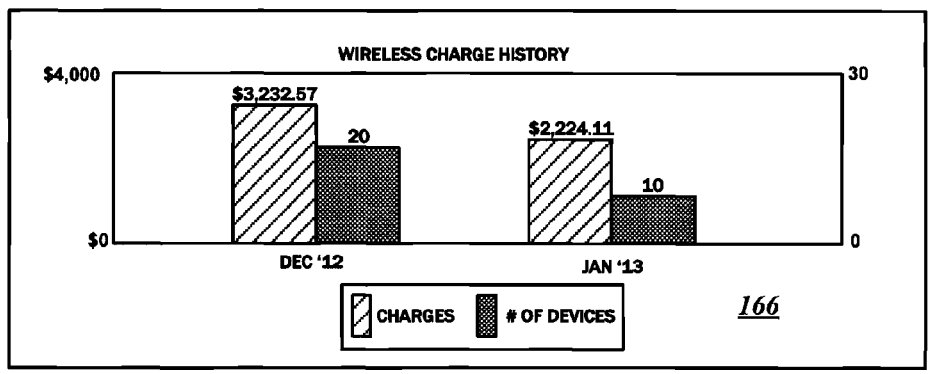
Figure 7C:
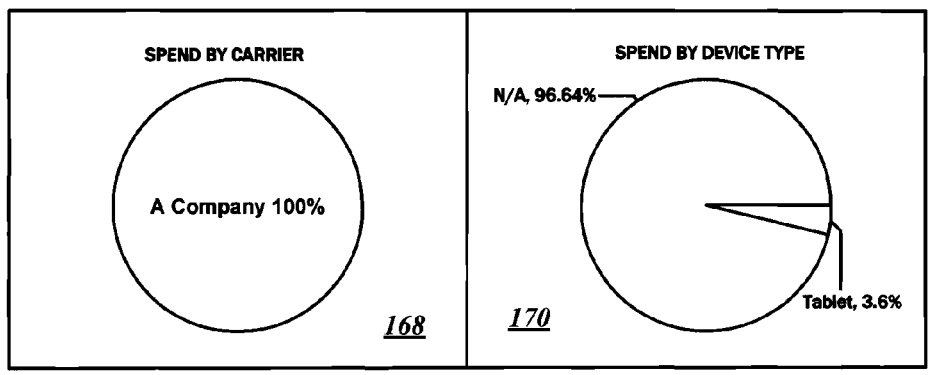
Figure 7C:
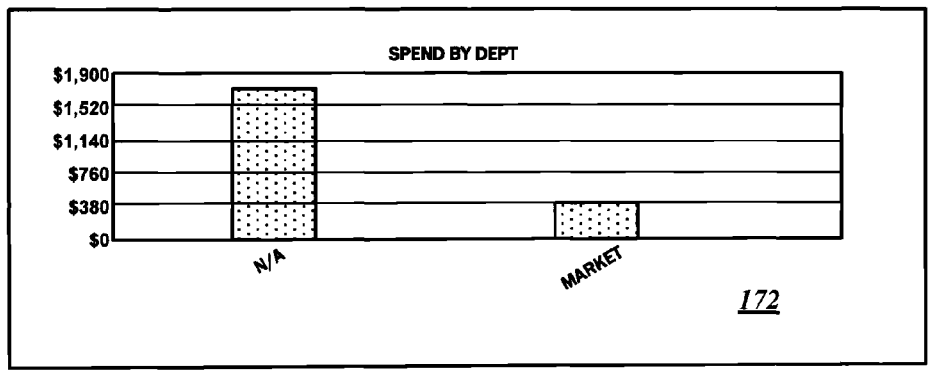

As shown in the FIG. 7C, the dashboard 138 also includes a visualization section 164 that includes a series of graphs that assist with quick comparisons of aggregated charge data. A first bar graph 166 plots both the total charges and the number of devices on a month-to-month basis. The magnitude of any reductions or increases can be readily ascertained therefrom. A first pie chart 168 shows the relative percentage of one wireless service provider or another, while a second pie chart 170 shows spending per device type. Further, a second bar graph 172 plots the relative spending amongst different divisions 14 of the enterprise 10.

Other visualizations include a top users section 174 as shown in FIG. 7D that is an ordered listing of all users 12 arranged according to charged amounts. One example use for this visualization is to identify those users 12 that have higher than normal usages, and/or to switch them to more cost-efficient subscription plans. There is also an unused devices section 176 shown in FIG. 7E, which is similar in function and content as the device management interface 158 shown in FIG. 8B. Again, it is understood to be useful for identifying potential communications devices 16 for cancellation since it appears unused.

The particulars shown herein are by way of example and for purposes of illustrative discussion of the embodiments of the present invention only and are presented in the cause of providing what is believed to be the most useful and readily understood description of the principles and conceptual aspects of mobile device usage reporting and management. In this regard, no attempt is made to show more details than is necessary for a fundamental understanding of the disclosure, the description taken with the drawings making apparent to those skilled in the art how the several forms of the presently disclosed methods may be embodied in practice.

What is claimed is:

1. A method for managing on an application service system one or more communications devices each associated with a user and a subscription account of a wireless service provider as identified by a wireless number, the method comprising the steps of:
   generating a first query to a first billing system of a first wireless service provider for charge data of the first one of the communications devices;
   receiving on the application service system charge data responsive to the first query;
   initiating a data communications link from the application service system to a second billing system of a different wireless service provider;
   logging into the second billing system with different administrator credentials associated with the enterprise by which at least one of the communication devices are managed;
   generating a second query to the second billing system of the different wireless service provider for charge data of a second one of the communications devices;
   receiving on the application service system charge data responsive to the second query;
   saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data; and
   generating on the application service system a report from the wireless device inventory database based upon at least a portion of an aggregate of data stored in the one of the device records.

2. The method of claim 1, wherein at least one of the billing systems includes an application programming interface, the application service system interacting with at least one of the billing systems over the application programming interface to receive the charge data for direct transfer into respective charge identifiers and charge amounts of the one of the device records for the communications device to which the charge data pertains.

3. The method of claim 1, further comprising:
   initiating a data communications link from the application service system to the first billing system; and
   logging into the first billing system with administrator credentials associated with an enterprise by which at least one of the communication devices are managed.

4. The method of claim 1, wherein the received charge data is in a raw format lacking direct correspondence to the respective charge identifiers and charge amounts of the one of the device records for the communication device to which the charge data pertains.

5. A method for managing on an application service system one or more communications devices each associated with a user and a subscription account of a wireless service provider as identified by a wireless number, the method comprising the steps of:
receiving on the application service system charge data from a billing system of the wireless provider for a first one of the communications devices;
saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data;
wherein the received charge data is in a raw format lacking direct correspondence to the respective charge identifiers and charge amounts of the one of the device records for the communication device to which the charge data pertains;
parsing the received charge data in the raw format to mapped fields and values corresponding to the respective charge identifiers and charge amounts of the one of the device records for the communications device to which the charge data pertains; and
generating on the application service system a report from the wireless device inventory database based upon at least a portion of an aggregate of data stored in the one of the device records.

6. The method of claim 1, wherein the device records are each additionally defined by a chargeback identifier.

7. A method for managing on an application service system one or more communications devices each associated with a user and a subscription account of a wireless service provider as identified by a wireless number, the method comprising the steps of:
receiving on the application service system charge data from a billing system of the wireless provider for a first one of the communications devices;
saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data, wherein the device records are each additionally defined by a chargeback identifier;
assigning a value for the chargeback identifier based upon a charge unit reference of the one of the device records for the communications device to which the charge data pertains;
wherein the charge unit reference is associated with a predefined division of an enterprise to which costs of the subscription account of the wireless service is allocated; and
generating on the application service system a report from the wireless device inventory database based upon at least a portion of an aggregate of data stored in the one of the device records.

8. A method for managing on an application service system one or more communications devices each associated with a user and a subscription account of a wireless service provider as identified by a wireless number, the method comprising the steps of:
receiving on the application service system charge data from a billing system of the wireless provider for a first one of the communications devices;
saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data, wherein the device records are each additionally defined by a chargeback identifier; and
generating on the application service system a report from the wireless device inventory database based upon at least a portion of an aggregate of data stored in the one of the device records;
wherein the generated report is a division report derived from the aggregate of data stored in the one of the device records, the device records for the division report each having common chargeback identifier values which are associated with the division of the enterprise.

9. A method for managing on an application service system one or more communications devices each associated with a user and a subscription account of a wireless service provider as identified by a wireless number, the method comprising the steps of:
receiving on the application service system charge data from a billing system of the wireless provider for a first one of the communications devices;
saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data, wherein the device records are each additionally defined by a chargeback identifier; and
generating on the application service system a report from the wireless device inventory database based upon at least a portion of an aggregate of data stored in the one of the device records
wherein the chargeback identifier is a cross reference to a division record stored in an enterprise division database, the division record being defined by at least a wireless number for a corresponding communications device and user associated therewith.

10. The method of claim 1, wherein the generated report is a finance report including the entirety of the aggregate of data stored in the one of the device records.

11. The method of claim 1, wherein the generated report is a personal report including the data for the one of the device records having a common.

12. The method of claim 1, further comprising:
flagging one or more device records with corresponding charge amounts below a predefined threshold.

13. The method of claim 1, wherein one of the charge identifiers is a flat fee assessed by the wireless service provider.

14. The method of claim 1, wherein one of the charge identifiers is a usage metric.

15. The method of claim 1, wherein one of the charge identifiers is a supplemental fee assessed for additional usage beyond one or more predefined subscription limits established by the wireless service provider.

16. An article of manufacture comprising a non-transitory program storage medium readable by a data processing apparatus, the medium tangibly embodying one or more programs of instructions executable by the data processing apparatus to perform a method for managing on an application service system one or more communications devices each associated with a user and a subscription account of a wireless service provider as identified by a wireless number, the method comprising the steps of:

receiving on the application service system charge data from a billing system of the wireless provider for a first one of the communications devices;

saving the charge data in a wireless device inventory database connected to the application service system, the wireless device inventory database including one or more device records each associated with a particular one of the communications devices and defined at least by a one of a wireless number and a charge record including one or more charge identifiers and corresponding charge amounts therefor, the charge data being stored in the charge record of a one of the device records for the communications device as designated by a device identifier included in the charge data, wherein the device records are each additionally defined by a chargeback identifier;

assigning a value for the chargeback identifier based upon a charge unit reference of the one of the device records for the communications device to which the charge data pertains;

wherein the charge unit reference is associated with a predefined division of an enterprise to which costs of the subscription account of the wireless service is allocated; and generating on the application service system a report from the wireless device inventory database based upon at least a portion of an aggregate of data stored in the one of the device records.

\* \* \* \* \*